United States Patent [19]
Connell et al.

[11] Patent Number: 5,637,670
[45] Date of Patent: Jun. 10, 1997

[54] POLYBENZIMIDAZOLES VIA AROMATIC NUCLEOPHILIC DISPLACEMENT

[75] Inventors: John W. Connell; Paul M. Hergenrother; Joseph G. Smith, Jr., all of Yorktown, Va.

[73] Assignee: The United States of America as represented by the Administrator, National Aeronautics and Space Administration, Washington, D.C.

[21] Appl. No.: 376,170

[22] Filed: Jan. 20, 1995

Related U.S. Application Data

[62] Division of Ser. No. 45,335, Apr. 5, 1993, Pat. No. 5,412,059.

[51] Int. Cl.$^6$ .................... C08G 73/18; C08G 73/08
[52] U.S. Cl. .................... 528/183; 528/125; 528/126; 528/128; 528/171; 528/172; 528/174; 528/210; 528/211; 528/215; 528/220; 528/226; 528/228; 528/373; 528/391; 528/422; 528/423; 526/935
[58] Field of Search .................... 528/125, 128, 528/126, 210, 211, 215, 216, 172, 174, 171, 226, 228, 220, 373, 391, 422, 423, 183; 526/935

[56] References Cited

U.S. PATENT DOCUMENTS

| | | | |
|---|---|---|---|
| 5,149,755 | 9/1992 | Perry | 528/210 |
| 5,182,356 | 1/1993 | Connell et al. | 528/210 |
| 5,270,432 | 12/1993 | Hergenrother et al. | 528/210 |
| 5,317,078 | 5/1994 | Connell et al. | 528/210 |

*Primary Examiner*—Samuel A. Acquah
*Assistant Examiner*—P. Hampton Hightower
*Attorney, Agent, or Firm*—George F. Helfrich

[57] ABSTRACT

Novel molecular weight controlled and endcapped polybenzimidazoles (PBI) are prepared by the aromatic nucleophilic displacement reaction of di(hydroxyphenylbenzimidazole) monomers with activated aromatic dihalides or activated aromatic dinitro compounds. The PBI are endcapped with mono(hydroxyphenyl)benzimidazoles. The polymerizations are carried out in polar aprotic solvents such as N-methyl-2-pyrrolidinone or N,N-dimethylacetamide using alkali metal bases such as potassium carbonate at elevated temperatures under nitrogen. Mono(hydroxyphenyl)benzimidazoles are synthesized by reacting phenyl-4-hydroxybenzoate with aromatic (o-diamine)s in diphenylsulfone. Molecular weight controlled and endcapped PBI of new chemical structures are prepared that exhibit a favorable combination of physical and mechanical properties.

6 Claims, 6 Drawing Sheets

Diphenylsulfone / Toluene
Nitrogen / Heat

V = OH, F, Cl, NO$_2$

W = H, CH$_3$, CH$_3$O,  , etc.

POLYBENZIMIDAZOLES VIA AROMATIC NUCLEOPHILIC DISPLACEMENT

CROSS REFERENCE TO RELATED APPLICATIONS

This is a divisional of application Ser. No. 08/045,335 filed on Apr. 5, 1993, now U.S. Pat. No. 5,412,059. This application is related to patent application Ser. No. 08/045, 339, filed Apr. 5, 1993, now U.S. Pat. No. 5,412,059, entitled "Poly(N-arylenebenzimidazole)s Via Aromatic Nucleophilic Displacement" and co-pending continuation-in-part patent application Ser. No. 07/790,730, filed Oct. 30, 1991, entitled "Polybenzimidazoles Via Aromatic Nucleophilic Displacement".

ORIGIN OF THE INVENTION

The invention described herein was jointly made by employees of the United States Government and a contract employee in the performance of work under NASA Grant No. NAG-1-448 and is subject to the provisions of Public Law 96-517 (35 USC 202) in which the contractor has elected not to retain title.

BACKGROUND OF THE INVENTION

1. Field of the Invention

This invention relates generally to heterocyclic polymers. In particular it relates to novel polybenzimidazoles and to a novel process for the preparation of molecular weight controlled and endcapped polybenzimidazoles.

2. Description of Related Art

Polybenzimidazoles (PBI) are heterocyclic polymers commonly prepared by the condensation reaction of an aromatic bis(o-diamine) with an aromatic diacid or derivative thereof and having a repeat unit of the general structure

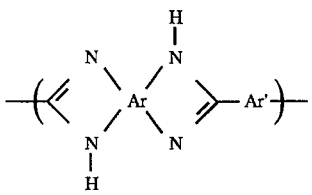

where Ar is a tetravalent aromatic radical such as 1,2,4,5-tetrasubstituted benzene. Ar may also be a bis(o-diphenylene) having the general structure

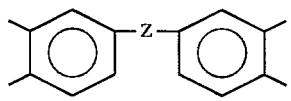

where Z=nil, O, S, $SO_2$, O=C, $CH_2$, or any other appropriate divalent radical. Ar' is a divalent aromatic radical which may be 1,3-phenylene, 1,4-phenylene, 4,4'-biphenylene, 4,4'-oxydiphenylene, 4,4'-sulfonyldiphenylene, or any other appropriate divalent radical.

The synthesis and characterization of PBI has been extensively studied and documented. Reviews on PBI are available. (A. Buckley, D. E. Stuez, and G. A. Serad, *Encyl. Poly. Sci. Tech.*, Vol. 11, 2nd ed., 1988, p. 572; P. E. Cassidy, "Thermally Stable Polymers", Marcel Dekker, Inc., New York, 1980, p. 163.) The first reported synthesis of PBI involved the reaction of aliphatic dicarboxylic acids with aromatic bis(o-diamine)s [K. C. Brinker and I. M. Robinson, U.S. Pat. No. 2,895,948 (Jul. 21, 1959)]. Since then several methods have been utilized in their preparation. Each method will be briefly mentioned with an accompanying reference. The most common synthetic method of PBI involves the melt condensation of aromatic bis(o-diamines) with aromatic diacids or derivatives thereof [H. Vogel and C. S. Marvel, *J. Polym. Sci.*, 50, 511 (1961)]. PBI has also been prepared in polyphosphoric acid [Y. Iwakura, K. Uno, and Y. Imai, *J. Polym. Sci., Part A*, 2, 2605 (1964)] and in sulfolane or diphenylsulfone [F. L. Hedberg and C. S. Marvel, *J. Polym. Sci., Poly. Chem.*, 12, 1823 (1974)] from aromatic bis(o-diamine)s and aromatic diacids or derivatives thereof.

Another preparative route involves the reaction of aromatic bis(o-diamine)s with the bis(bisulfite adduct)s of dihaldehydes [J. Higgins and C. S. Marvel, *J. Polym. Sci., Part A-1*, 8, 171 (1970)]. The alkoxide catalyzed reaction of aromatic bis(o-diamine)s with dinitriles is another synthetic route [D. I. Packham, J. D. Davies, and H. M. Paisley, *"Polymer*, 10, (12), 923 (1969)]. A recent preparative approach involved the nucleophilic displacement of bis(4-fluorophenylbenzimidazole) with alkali metal bisphenates (J. W. Connell in "Adhesives and Sealants in Engineered Materials Handbook", ASM International, 1990, Vol. 3, p. 169).

To obtain polymer with low melt viscosity, the molecular weight of a polymer can be lowered and controlled by using a stoichiometric imbalance of one of the monomers. This is expressed mathematically by a modification of the Crouthers equation for AA-BB type monomers (Polymer Chemistry: An Introduction, 2nd Ed., M>P. Stevens, Oxford University, New York, 1990, 335–337).

$$DP=(1+r)/(1-r)$$

where

DP: degree of polymerization r: stoichiometric imbalance; $0.5 < r < 1.0$.

For r=1, there is no stoichiometric imbalance of monomers in the polymerization reaction. The calculated number average molecular weight can then be determined by $$M_n=(0.5) \times (MW \text{ of repeat unit}) \times (DP)$$

where $M_n$=number average molecular weight

MW of repeat unit=molecular weight of polymer repeat unit.

Endcapping the polymer is achieved by using $2 \times (1-r)$ of a monofunctional reagent in the polymerization reaction based on monofunctional endcapping technology [D. Progar, T. St. Clair, H. Burks, C. Gautreau, A. Tamaguchi, and M. Ohta, *SAMPE J.*, 52 (Jan/Feb 1990)]. An endcapped version of poly[2,2'-(m-phenylene-5,5'-dibenzimidazole)] has recently been reported [M. Jaffe, E. C. Chenvey, W. M. Cooper, M. Glick, and I. Taider, *Polym. Prepr.*, 32(2), 207 (1991)].

SUMMARY OF THE INVENTION

A primary object of the present invention is to provide novel polybenzimidazole (PBI) compositions of matter.

Another object is to provide a new process to prepare molecular weight controlled and endcapped PBI.

Yet another object is to provide new molecular weight controlled and endcapped PBI that are useful as adhesives, coatings, films, fibers, membranes, moldings, and composite matrices.

According to the present invention, the foregoing and additional objects were obtained by synthesizing molecular weight controlled and endcapped PBI by nucleophilic displacement reaction of di(hydroxyphenyl)benzimidazole monomers with activated aromatic dihalides. Endcapping of the molecular weight controlled polymer was achieved by using a mono(hydroxyphenyl)benzimidazole. The inherent viscosities ($\eta_{inh}$) of the molecular weight controlled and endcapped PBI ranged from 0.55 to 1.65 dL/g and the glass transition temperatures ($T_g$) ranged from 266°–274° C. An unendcapped, uncontrolled molecular weight PBI polymer (no stoichiometric imbalance) had an inherent viscosity of 2.00 dL/g and a glass transition temperature of 276° C. Thermogravimetric analysis (TGA) at a heating rate of 2.5° C./min showed no weight loss occurring below 300° C. in air or nitrogen with a 5% weight loss occurring at about 470° C. in air and about 490° C. in nitrogen.

The synthesis of molecular weight controlled and endcapped PBI involved the use of di(hydroxyphenyl)benzimidazoles and mono(hydroxyphenyl)benzimidazoles. The monomers were prepared from phenyl-4-hydroxybenzoate and aromatic bis(o-diamine)s. The catenation of the hydroxy groups may be meta-meta, para-para, or para-meta. The monofunctional benzimidazole, used as an endcapping agent, was prepared from phenyl-4-hydroxybenzoate and o-phenylene diamine. The catenation of the functional group may be para or meta.

BRIEF DESCRIPTION OF THE DRAWINGS

For a more complete understanding of the present invention including its objects and benefits, reference should be made to the Description of the Preferred Embodiments, which is set forth below. This description should be read together with the accompanying drawings, wherein.

DESCRIPTION OF THE PREFERRED EMBODIMENTS

Figure 1:
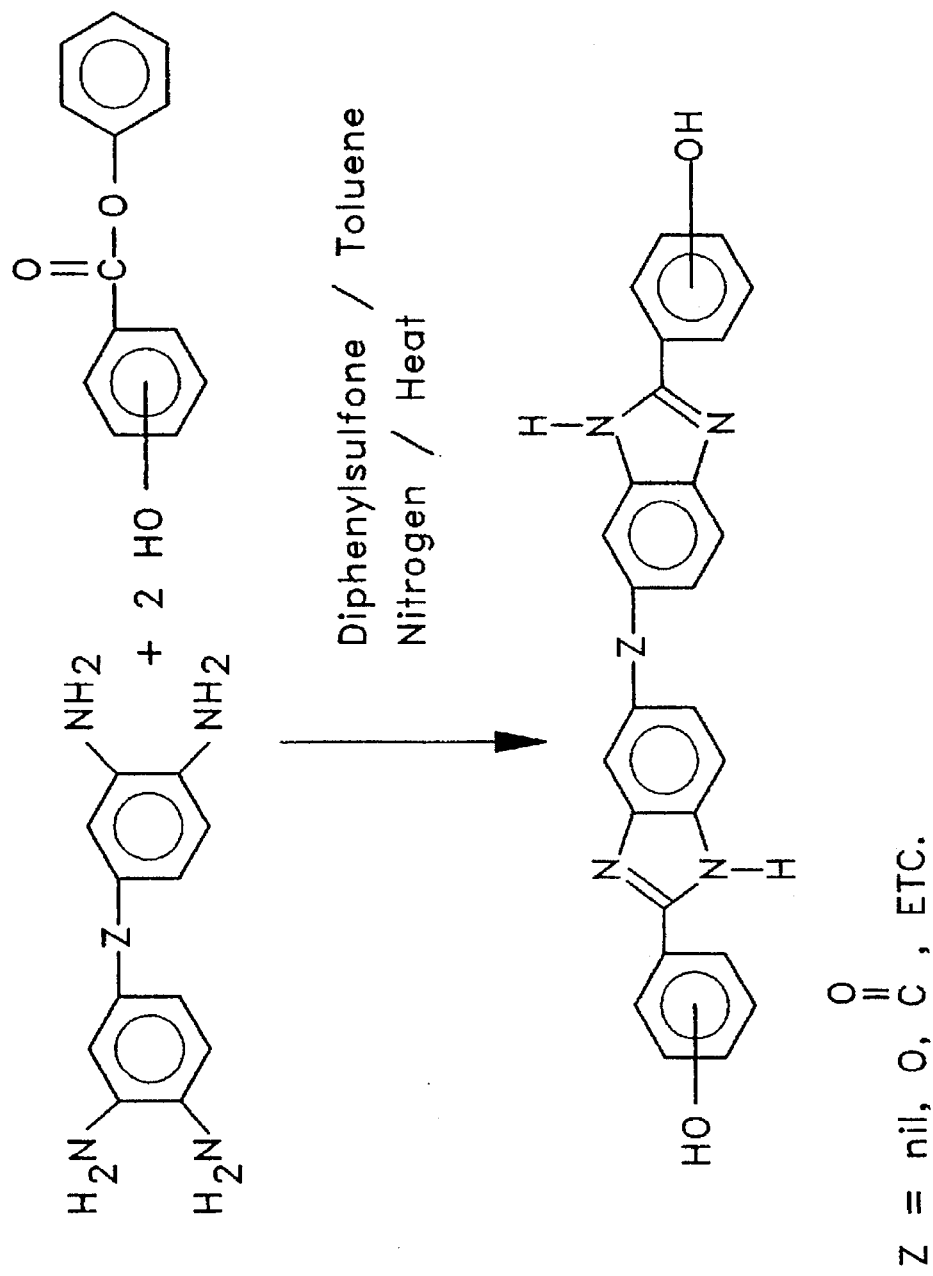
FIG. 1 is an equation showing the preparation of monomers according to the present invention from phenyl-4-hydroxybenzoate and aromatic bis(o-diamine)s.

In one aspect, the present invention is a molecular weight controlled and endcapped poly(benzimidazole) consisting of repeat units having the general structural formula wherein the catenation of oxygen is selected from the group consisting of meta-meta, para-para, and para-meta. Ar is a radical selected from the group consisting of

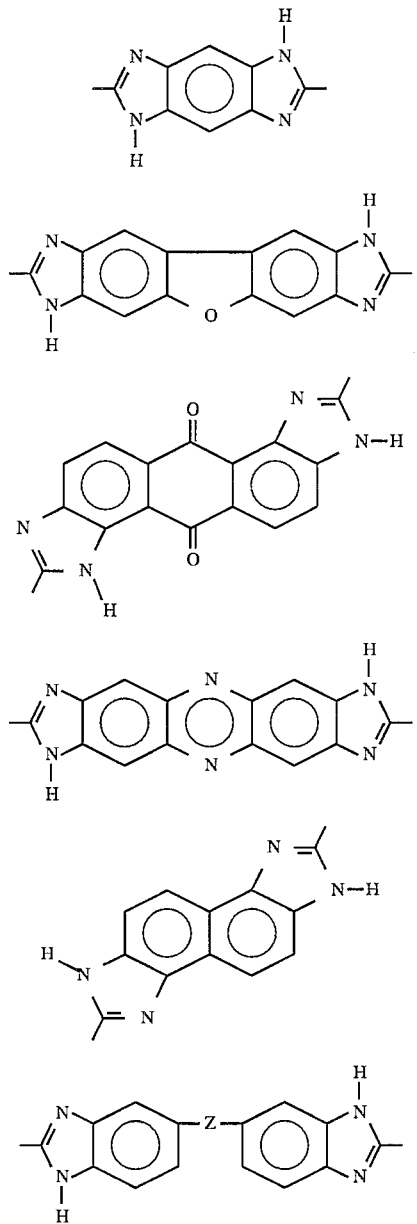

and Z is a radical selected from the group consisting of nil, $CH_2$, O, S, O=C, $SO_2$,

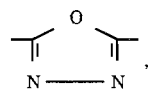

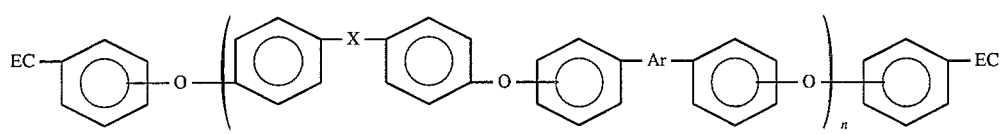

etc.

X is a radical selected from the group consisting of $-\overset{O}{\underset{\|}{C}}-$ $-SO_2-$

[structures of aromatic diacyl groups: phthaloyl, terephthaloyl, naphthalene-dicarbonyl, biphenyl-dicarbonyl isomers, naphthalene-2,6-dicarbonyl]

$-\overset{O}{\underset{\|}{P}}-$ phenyl

[diphenylmethane-dicarbonyl, diphenylether-dicarbonyl structures]

[tri-carbonyl structure with two phenyl rings connected]

EC is a radical selected from the group consisting of:

[5,6-dimethyl-2-methyl-benzimidazole]

[naphtho-imidazole with 2-methyl]

[benzimidazole with W substituent]

W is a radical selected from the group consisting of H, CH$_3$, CH$_3$O,

[benzoyl group]

The monomer ratio (r) is $0.5 \leq r \leq 1$, and n is an integer between 4 and 1000.

An especially preferred embodiment of a molecular weight controlled and endcapped poly(benzimidazole) is presented when Ar is a radical represented by

[bis-benzimidazole structure],

X is a radical represented by

[isophthaloyl group],

EC is a radical represented by

[benzimidazole with W substituent],

W is a radical represented by H, and the monomer ratio (r) is 0.93, 0.97, 0.985 and 1.

In another aspect, the present invention is a process for synthesizing molecular weight controlled and endcapped poly(benzimidazole)s by aromatic nucleophilic displacement. The process includes reacting a di(hydroxyphenyl) benzimidazole and a monofunctional benzimidazole having the general structure

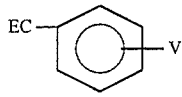

wherein EC is a radical selected from the group consisting of:

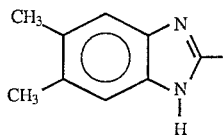

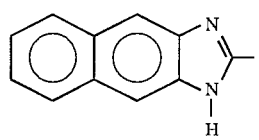

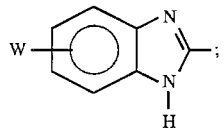

W is a radical selected from the group of

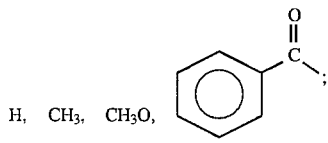

V is selected from the group consisting of OH, Cl, F, $NO_2$; and the catenation of V is selected from meta and para. Also reacted is an activated aromatic dihalide or aromatic dinitro compound having the general structure

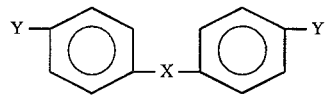

wherein X is a radical selected from the group consisting from

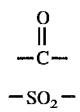

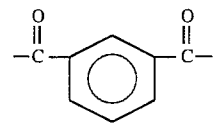

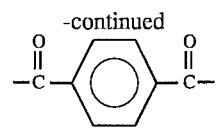

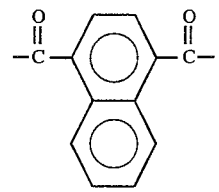

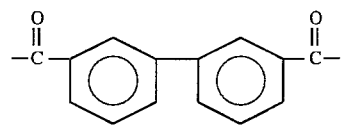

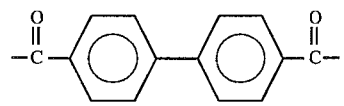

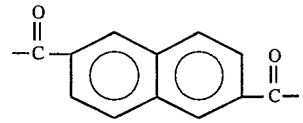

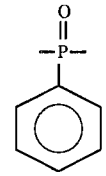

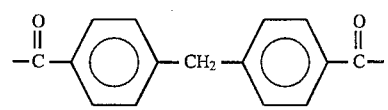

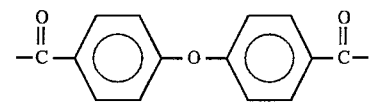

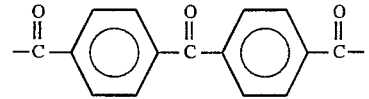

wherein Y is selected from the group consisting of Cl, F, and $NO_2$. The reaction is carried out in a polar aprotic solvent selected from the group consisting of N,N-dimethylacetamide, N-methyl-2-pyrrolidinone, sulfolane, diphenylsulfone, N-cyclohexyl-2-pyrrolidinone, and dimethylsulfoxide. The reaction is also carried out in the presence of an alkali metal base selected from the group consisting of potassium carbonate, sodium carbonate, potassium hydroxide, and sodium hydroxide, and the reaction is carried out with the application of heat.

Especially advantageous results are achieved if

X is 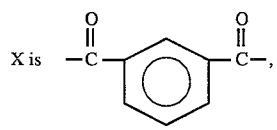

Ar is 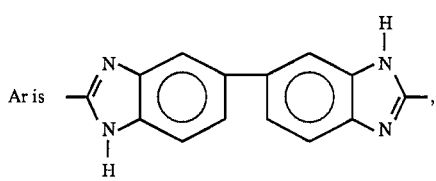,

EC is 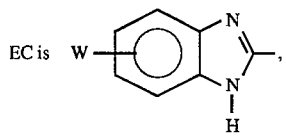,

W is H,
V is OH,
Y is Cl or F, preferably F,
and the solvent is N,N-dimethylacetamide.

In other aspects, the present invention is a molecular weight controlled and endcapped poly(benzimidazole): film, fiber, molding, adhesive, and matrix resin for composites.

In yet another aspect the present invention is a molecular weight controlled and unendcapped poly(benzimidazole) consisting of repeat units having the general structural formula

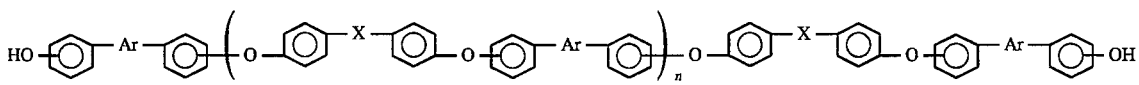

or

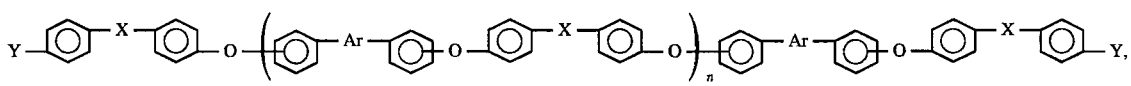

wherein the catenation of oxygen is selected from the group consisting of meta-meta, para-para, and para-meta. Y is F, Cl, or $NO_2$; and Ar is a radical selected from the group of

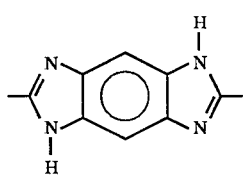

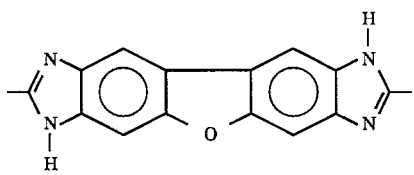

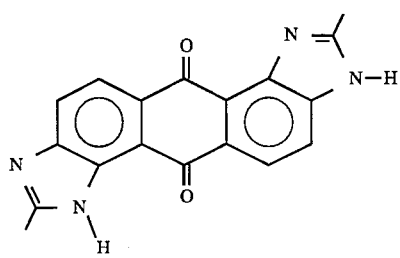

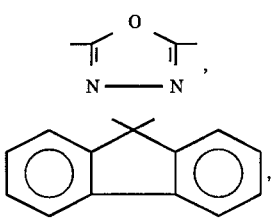

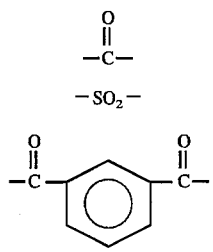

Z is a radical selected from the group consisting of nil, $CH_2$, O, S, O=C, $SO_2$, etc.

X is a radical selected from the group consisting of $$\overset{O}{\underset{\|}{-C-}}$$

$-SO_2-$ $$-\overset{O}{\underset{\|}{C}}-\bigcirc-\overset{O}{\underset{\|}{C}}-$$

-continued $$-\overset{O}{\underset{\|}{C}}-\phenyl-\overset{O}{\underset{\|}{C}}-$$

$$-\overset{O}{\underset{\|}{C}}-naphthyl-\overset{O}{\underset{\|}{C}}-$$

$$-\overset{O}{\underset{\|}{C}}-\phenyl-\phenyl-\overset{O}{\underset{\|}{C}}-$$

$$-\overset{O}{\underset{\|}{C}}-\phenyl-\phenyl-\overset{O}{\underset{\|}{C}}-$$

$$-\overset{O}{\underset{\|}{C}}-naphthyl-\overset{O}{\underset{\|}{C}}-$$

$$-\overset{O}{\underset{\|}{P}}-\phenyl$$

$$-\overset{O}{\underset{\|}{C}}-\phenyl-CH_2-\phenyl-\overset{O}{\underset{\|}{C}}-$$

$$-\overset{O}{\underset{\|}{C}}-\phenyl-O-\phenyl-\overset{O}{\underset{\|}{C}}-$$

$$-\overset{O}{\underset{\|}{C}}-\phenyl-\overset{O}{\underset{\|}{C}}-\phenyl-\overset{O}{\underset{\|}{C}}-;$$

the monomer ratio (r) is $0.5 \leq r \leq 1$ and n is an integer between 4 and 1000.

In another aspect, the present invention is a process for synthesizing molecular weight controlled and unendcapped poly(benzimidazole)s by aromatic nucleophilic displacement. The process includes reacting a di(hydroxyphenyl) benzimidazole with an activated aromatic dihalide or aromatic dinitro compound having the general structure

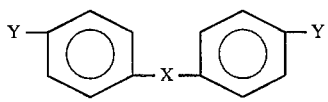

wherein X is a radical selected from the group consisting of $$-\overset{O}{\underset{\|}{C}}-$$

$$-SO_2-$$

$$-\overset{O}{\underset{\|}{C}}-\phenyl-\overset{O}{\underset{\|}{C}}-$$

$$-\overset{O}{\underset{\|}{C}}-\phenyl-\overset{O}{\underset{\|}{C}}-$$

$$-\overset{O}{\underset{\|}{C}}-naphthyl-\overset{O}{\underset{\|}{C}}-$$

$$-\overset{O}{\underset{\|}{C}}-\phenyl-\phenyl-\overset{O}{\underset{\|}{C}}-$$

$$-\overset{O}{\underset{\|}{C}}-\phenyl-\phenyl-\overset{O}{\underset{\|}{C}}-$$

$$-\overset{O}{\underset{\|}{C}}-naphthyl-\overset{O}{\underset{\|}{C}}-$$

$$-\overset{O}{\underset{\|}{P}}-\phenyl$$

$$-\overset{O}{\underset{\|}{C}}-\phenyl-CH_2-\phenyl-\overset{O}{\underset{\|}{C}}-$$

$$-\overset{O}{\underset{\|}{C}}-\phenyl-O-\phenyl-\overset{O}{\underset{\|}{C}}-$$

$$-\overset{O}{\underset{\|}{C}}-\phenyl-\overset{O}{\underset{\|}{C}}-\phenyl-\overset{O}{\underset{\|}{C}}-.$$

Y is selected from the group consisting of Cl, F, and $NO_2$. The reaction is carded out in a polar aprotic solvent selected from the group consisting of N,N-dimethylacetamide, N-methyl-2-pyrrolidinone, sulfolane, diphenylsulfone, N-cyclohexyl-2-pyrrolidinone, and dimethylsulfoxide. The reaction is also carried out in the presence of an alkali metal base selected from the group consisting of potassium carbonate, sodium carbonate, potassium hydroxide, and sodium hydroxide, and the reaction is carried out with the application of heat.

In other aspects, the present invention is a molecular weight controlled and unendcapped poly(benzimidazole): film, fiber, molding, adhesive, and matrix resin for composites.

Having generally described the invention a more complete understanding thereof can be obtained by reference to the following examples, which are provided herein for purposes of illustration only and do not limit the invention.

EXAMPLE 1

Endcap Synthesis

Figure 2:
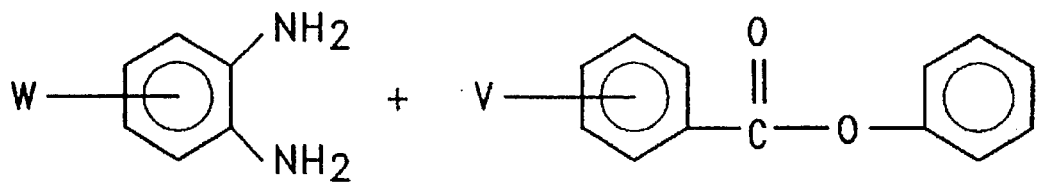
FIG. 2 is an equations showing the preparation of an endcapping agent according to the present invention from phenyl-4-hydroxybenzoate and o-phenylene diamine.
Figure 2:
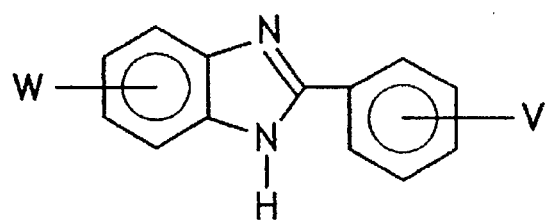
Figure 2:
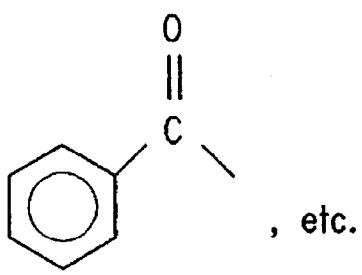

The following example illustrates the reaction sequence in FIG. 2 for the preparation of the endcapping agent.

2-(4-Hydroxyphenyl)benzimidazole

A mixture of 1,2-diaminobenzene (25.17 g, 0.233 mol), phenyl-4-hydroxphenylbenzoate (50.17 g, 0.234 mol), diphenylsulfone (121.15 g), and toluene (100 ml) were heated under a nitrogen atmosphere for 16 hours at 150° C. The toluene was removed and the temperature increased to 260° C. and maintained for two and one-half hours. A vacuum was subsequently applied and the temperature increased to 290° C. and maintained for one and one-half hours. The warm reaction mixture was precipitated in toluene, washed in hot toluene, and subsequently dried at 110° C. to afford 45.00 g (92% crude yield) of a red-tan powder, m.p. (DTA) 279° C. (broad). The solid was recrystallized from 40% aqueous ethanol using charcoal to afford a light tan crystalline product (31.46 g, 64% yield). The compound exhibited a sharp melt by DTA with an endothermic minimum at 280° C. Anal. calcd for $C_{13}H_{10}N_2O$: C, 74.27%; H, 4.79%; N, 13.32%; Found: C, 74.21%; H, 4.75%; N, 13.21%.

EXAMPLE 2

Molecular Weight Controlled and Endcapped Poly (arylene ether benzimidazole) Synthesis

0% Stoichiometric Offset, 0% Endcapped PBI

The following example illustrates the reaction sequence for the preparation of high molecular weight polymer where X is equal to an isophthaloyl group, Y is F, and Z is 5,5'-nil, the catenation of the hydroxy groups is para-para, and the stoichiometric imbalance is 0% (r=1).

Into a 100 ml three necked round bottom flask equipped with nitrogen inlet, thermometer, mechanical stirrer, and Dean Stark trap was placed 5,5'-bis[2-(4-hydroxyphenyl) benzimidazole] (2.0392 g, 4.9 mmol), 1,3-bis(4-fluorobenzoyl)benzene (1.5707 g, 4.9 mmol), pulverized anhydrous potassium carbonate (1.7379 g, 12,6 mmol), dry DMAc (18 ml, 18% solids w/w) and toluene (50 ml). The mixture was heated to 140°–150° C. for three and one-half hours and then heated to 155°–160° C. After about two hours the viscous reaction mixture was diluted with 21 ml DMAc (9.0% solids w/w) and stirring continued at 155°–160° C. The viscous reaction mixture was diluted again with 25 ml DMAc (5.7% solids w/w) after an additional three-quarters hour. The viscous solution was precipitated in a water/acetic acid (10/1) mixture, washed successively in hot water and methanol and dried at 110° C. to provide a light brown polymer (2.48 g, 73% yield) with a $T_g$ of 276° C. The inherent viscosity of a 0.5% solution is DMAc at 25° C. was 2.00 dL/g. Unoriented thin films cast from a DMAc solution gave tensile strength, tensile modulus, and elongation at 23° C. of 18.2 ksi, 602 ksi, and 14%, respectively; at 177° C. of 14.0 ksi, 447 ksi, and 7%, respectively; and at 232° C. of 12.4 ksi, 409 ksi, and 7%, respectively.

EXAMPLE 3

1.5% Stoichiometric Offset, 3% Endcapped PBI

Figure 3:
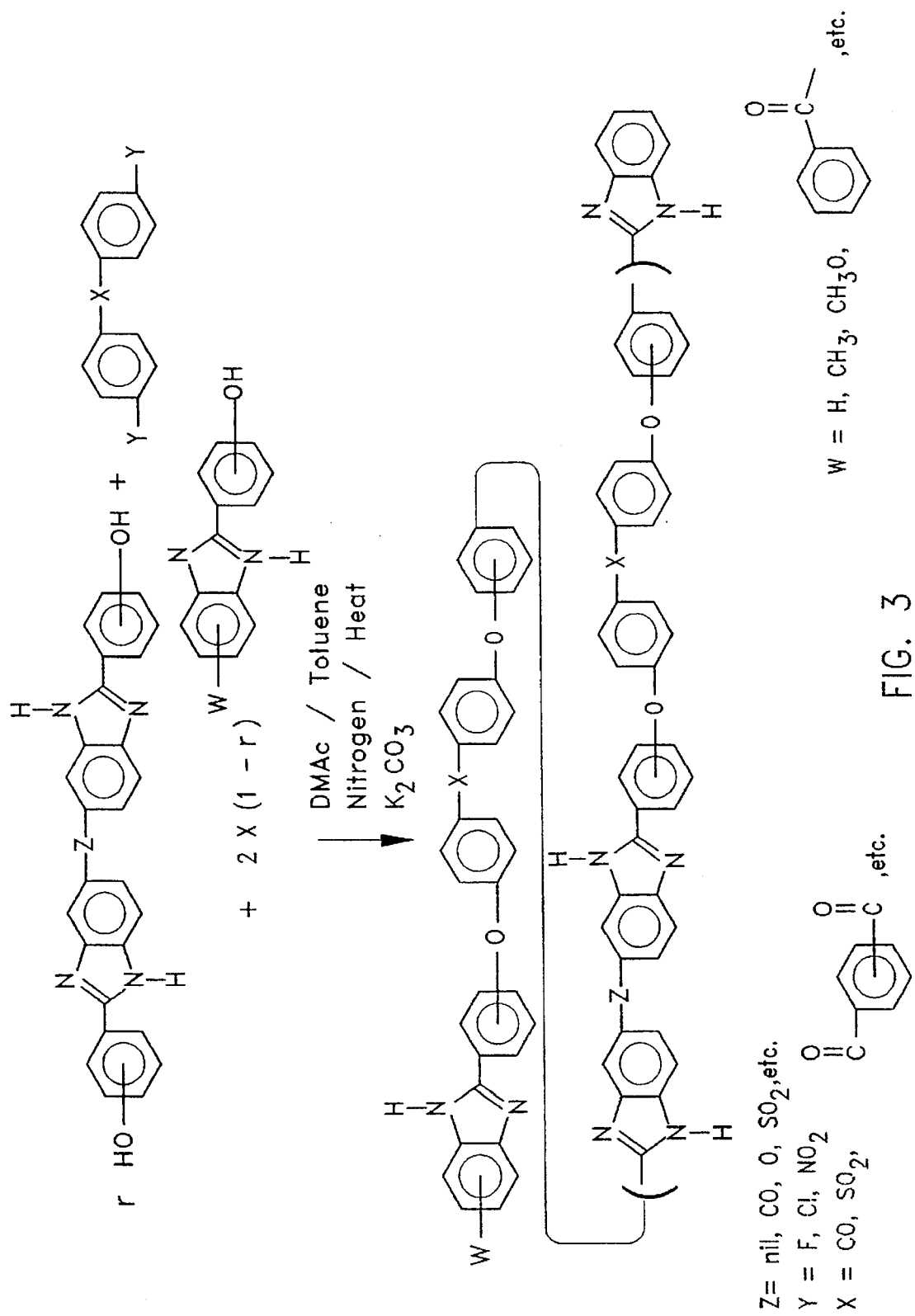
FIGS. 3 and 4 are equations showing the general reaction sequence for the synthesis of molecular weight controlled and endcappped polybenzimidazoles according to the present invention.
Figure 4:
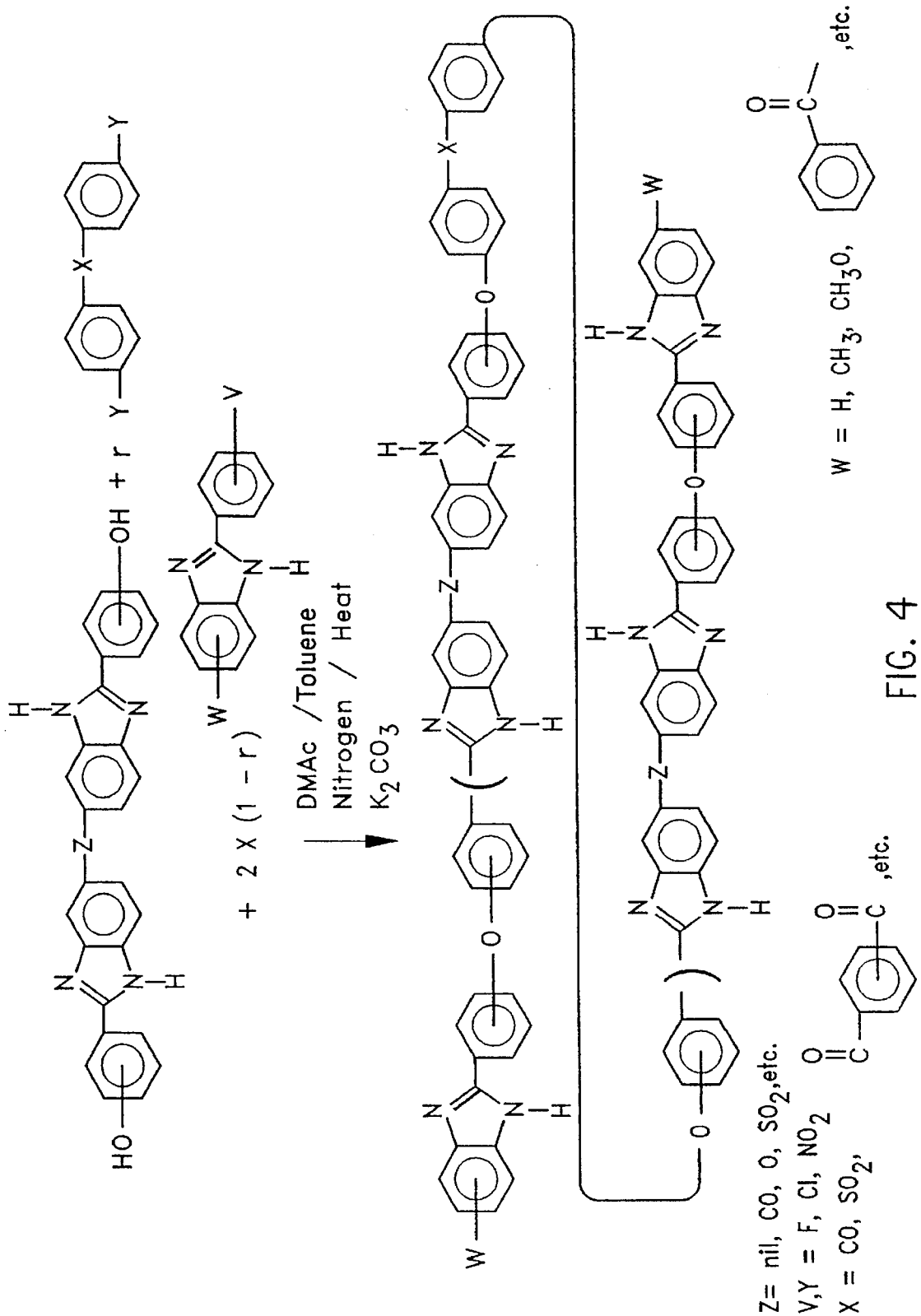
Figure 5:
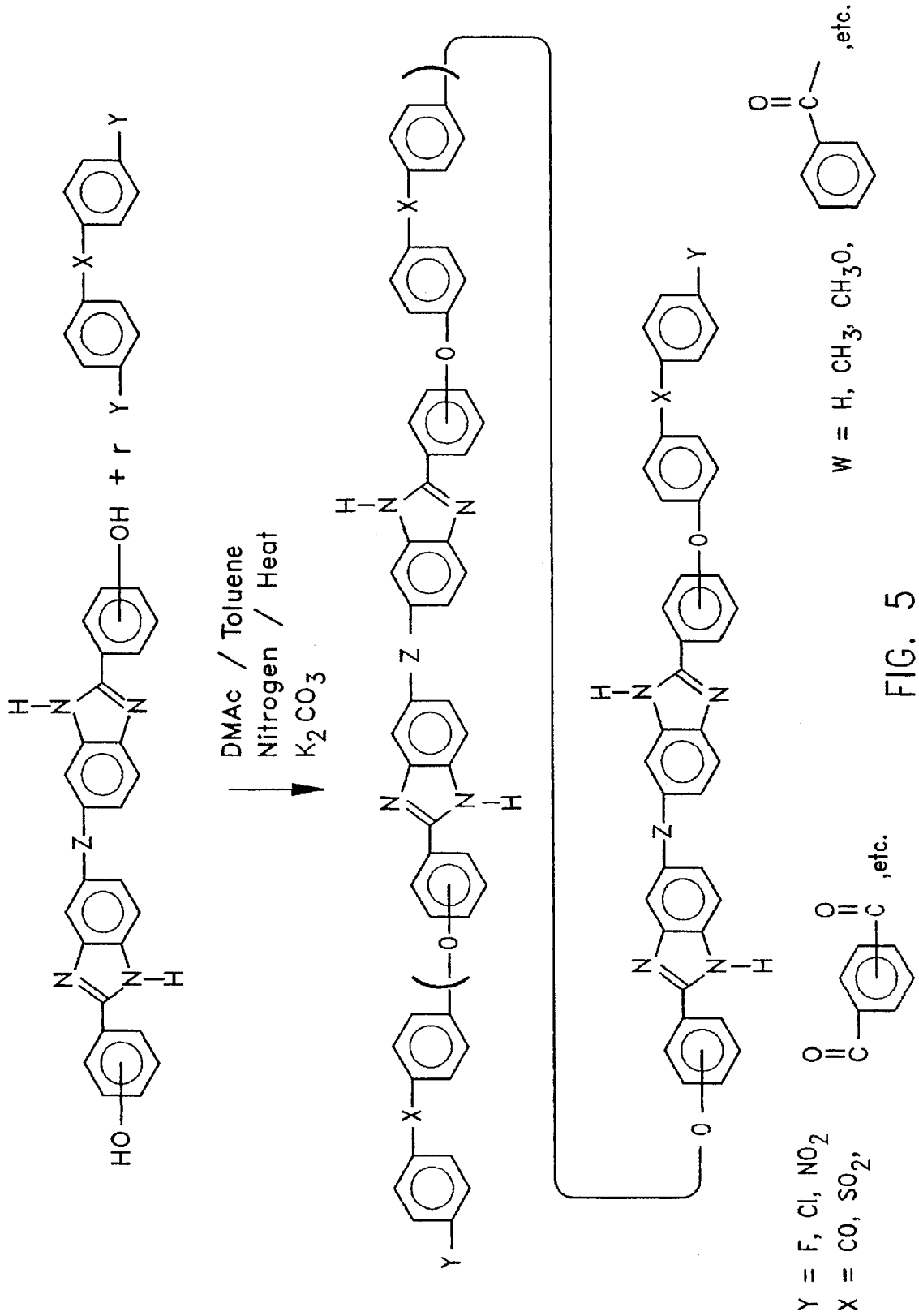
FIGS. 5 and 6 are equations showing the general reaction sequence for the synthesis of molecular weight controlled and unendcapped PBI according to the present invention.
Figure 6:
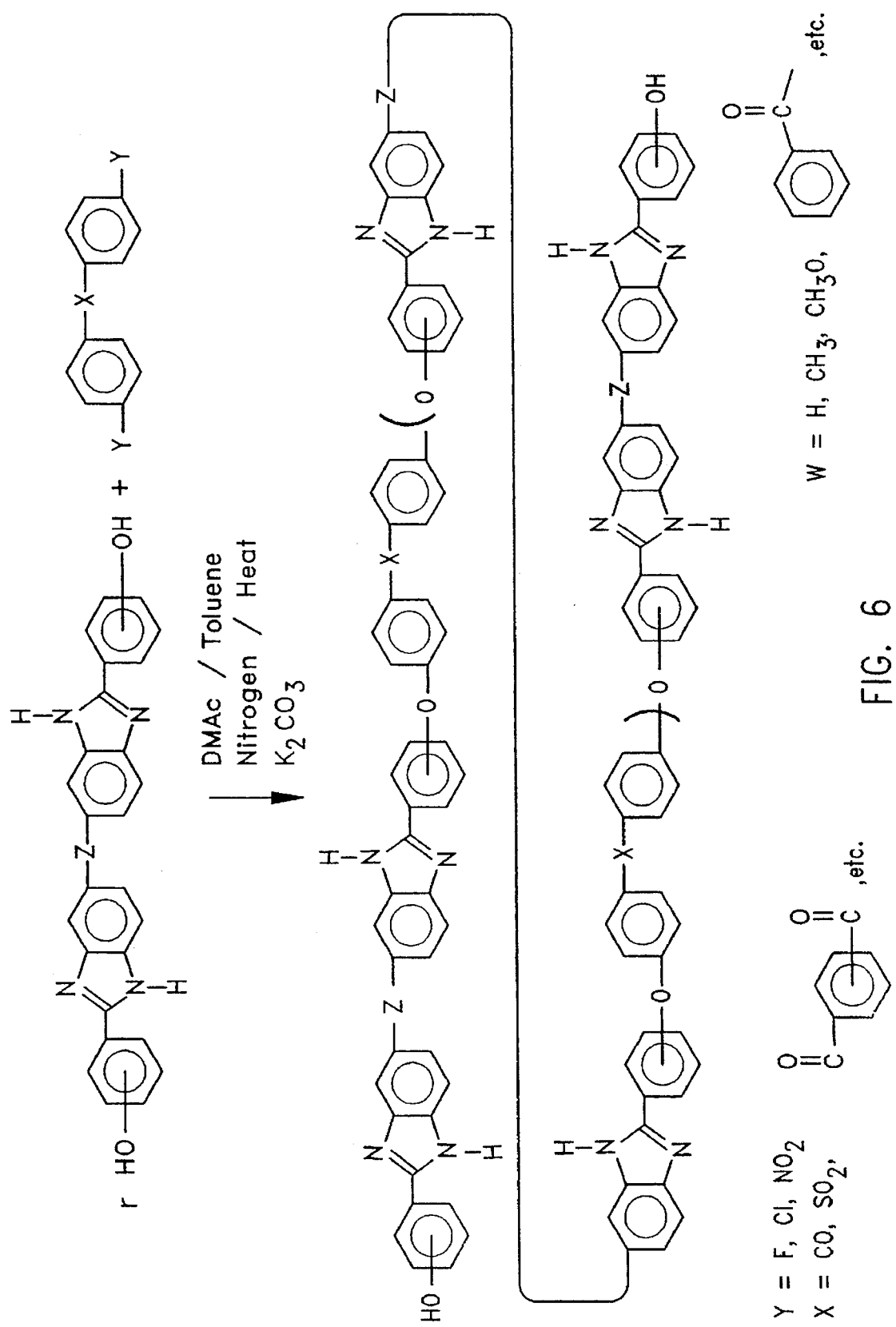

The following example illustrates the reaction sequence in FIG. 3 for the preparation of the molecular weight controlled and endcapped polymer where X is equal to an isophthaloyl group, Y is F, and Z is 5,5'-nil, the catenation of the hydroxy groups is para-para and the stoichiometric imbalance is 1.5% (r=0.985). The endcapping reagent [3%, 2×(1–r)] is 2-(4-hydroxyphenyl)benzimidazole.

Into a 2000 ml three necked round bottom flask equipped with nitrogen inlet, thermometer, mechanical stirrer, and Dean Stark trap was placed 5,5'-bis[2-(4-hydroxyphenyl) benzimidazole] (30.2497 g, 72.3 mmol), 1,3-bis(4-fluorobenzoyl)benzene (23.6544 g, 73.4 mmol), 2-(4-hydroxyphenyl)-benzimidazole (0.4629 g, 2.2 mmol), pulverized anhydrous potassium carbonate (25.8851 g, 187.3 mmol), dry DMAc (250 ml, 18.8% solids w/w) and toluene (225 ml). The mixture was heated to 140°–150° C. for five hours and then heated to 155°–160° C. The viscous reaction mixture was diluted again with 250 ml of DMAc (7.2% solids w/w) after an additional one hour. Stirring was continued for one and one-quarter hour at 155°–160° C. After about one hour the viscous reaction mixture was diluted with 250 ml DMAc (10.4% solids w/w) and stirring continued at 155°–160° C. and the reaction mixture was cooled. The viscous solution was precipitated in a water/ acetic acid (10/1) mixture, washed successively in hot water and methanol and dried at 110° C. to provide a light tan polymer (47.3 g, 92% yield) with a $T_g$ of 274° C. The inherent viscosity of 0.5% solution in DMAc at 25° C. was 1.65 dL/g. Unoriented thin films cast from a DMAc solution gave tensile strength, tensile modulus, and elongation at 23° C. of 18.1 ksi, 524 ksi, and 12%, respectively, at 177° C. of 14.0 ksi, 432 ksi, and 6%, respectively; and at 232° C. of 11.7 ksi, 364 ksi, and 5%, respectively. $G_{ic}$=4.9 (in lb)/in². (Fracture toughness, critical strain energy release rate.)

EXAMPLE 4

3.0% Stoichiometric Offset, 6% Endcappped PBI

The following example illustrates the reaction sequence in FIG. 3 for the preparation of the molecular weight controlled and endcapped polymer where X is equal to an isophthaloyl group, Y is F, and Z is 5,5'-nil, the catenation of the hydroxy groups is para-para and the stoichiometric imbalance is 3.0% (r=0.97). The endcapping reagent [6%, 2×(1–r)] is 2-(4-hydroxyphenyl)benzimidazole.

Into a 2000 ml three necked round bottom flask equipped with nitrogen inlet, thermometer, mechanical stirrer, and Dean Stark trap was placed 5,5'-bis[2-(4-hydroxyphenyl) benzimidazole] (68.7930 g, 164.4 mmol), 1,3-bis(4-fluorobenzoyl)benzene (54.6260 g, 169.5 mmol), 2-(4-hydroxyphenyl)benzimidazole (2.1379 g, 10.2 mmol), pulverized anhydrous potassium carbonate (59.83 g, 432.9 mmol), dry DMAc (600 ml, 18.3% solids w/w) and toluene (250 ml). The mixture was heated to 140°–150° C. for seven and one-half hours and then heated to 155°–160° C. After about one and one-half hours the viscous reaction mixture was diluted with 600 ml DMAc (10.0% solids w/w) and stirring continued for an additional one-half hour at 155°–160° C. and the reaction mixture was cooled. The viscous solution was precipitated in a water/acetic acid (10/1) mixture, washed successively in hot water and methanol and dried at 110° C. to provide a light tan polymer (115.2 g, 97% yield) with a $T_g$ of 274° C. The inherent viscosity of 0.5% solution in DMAc at 25° C. was 1.42 dL/g. Unoriented thin films cast from a DMAc solution gave tensile strength, tensile modulus, and elongation at 23° C. of 18.7 ksi, 582 ksi, and 30%, respectively, at 177° C. of 13.6 ksi, 429 ksi, and 11%, respectively; and at 232° C. of 12.0 ksi, 406 ksi, and 12%, respectively. $G_{ic}$=5.7 (in lb)/in². (Fracture toughness, critical strain energy release rate.)

EXAMPLE 5

7.0% Stoichiometric Offset, 14% Endcapped PBI

The following example illustrates the reaction sequence in FIG. 3 for the preparation of the molecular weight controlled and endcapped polymer where X is equal to an isophthaloyl group, Y is F, and Z is 5,5'-nil, the catenation of the hydroxy groups is para-para and the stoichiometric imbalance is 7.0% (r=0.93). The endcapping reagent is [14%, 2×(1−r)] is 2-(4-hydroxyphenyl)benzimidazole.

Into a 2000 ml three necked round bottom flask equipped with nitrogen inlet, thermometer, mechanical stirrer, and Dean Stark trap was placed 5,5'-bis[2-(4-hydroxyphenyl) benzimidazole] (56.0292 g, 133.9 mmol), 1,3-bis(4-fluorobenzoyl)benzene (46.4043 g, 144.0 mmol), 2-(4-hydroxyphenyl)-benzimidazole (4.2376 g, 20.02 mmol), pulverized anhydrous potassium carbonate (51.8656 g, 3.75 mmol), dry DMAc (500 ml, 18.5% solids w/w) and toluene (200 ml). The mixture was heated to 140°–150° C. for five hours and then heated to 155°–160° C. After about one and three-quarters hours the viscous reaction mixture was diluted with 400 ml DMAc (11.2% solids w/w) and stirring continued for an additional one-half hour at 155°–160° C. The viscous reaction mixture was diluted again with 370 ml hot DMAc (8.5% solids w/w) after and additional four hours. The viscous solution was precipitated in a water/acetic acid (10/1) mixture, washed successively in hot water and methanol and dried at 110° C. to provide a light tan polymer (96.85 g, 96% yield) with a $T_g$ of 266° C. The inherent viscosity of 0.5% solution in DMAc at 25° C. was 0.55 dL/g. Unoriented thin films cast from a DMAc solution gave tensile strength, tensile modulus, and elongation at 23° C. of 16.5 ksi, 530 ksi, and 22%, respectively, at 177° C. of 13.1 ksi, 426 ksi, and 23%, respectively; and at 232° C. of 10.3 ksi, 384 ksi, and 10%, respectively. $G_{ic}$=2.2 (in lb)/in². (Fracture toughness, critical strain energy release rate.)

Polymer characterization and unoriented thin film properties are presented in Table 1. Adhesive properties of the 3% stoichiometric imbalance and endcapped polymer are presented in Table 2. Adhesive properties of the 7% stoichiometric imbalance and endcapped polymer are presented in Table 3, and composite properties of the 7% stoichiometric imbalance and endcapped polymer are presented in Table 4.

TABLE 1

CHARACTERIZATION OF MOLECULAR WEIGHT CONTROLLED PAEBI

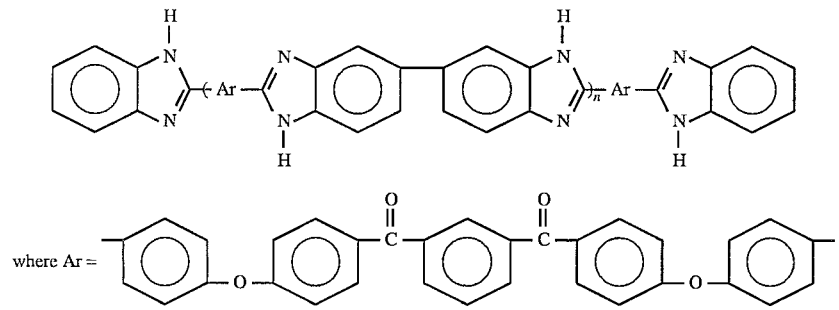

| PROPERTIES | STOICHIOMETRIC IMBALANCE | | | |
| --- | --- | --- | --- | --- |
|  | 0% | 1.5% | 3% | 7% |
| $\eta_{inh}$, dL/g | 2.00 | 1.65 | 1.42 | 0.55 |
| $T_g$, °C. (powder) | 276 | 274 | 274 | 266 |
| $T_g$, °C. (film) | 284 | 287 | 284 | 273 |
| Temp. of 5% wt. loss air/N2 | 476/515 | 467/511 | 467/507 | 470/472 |
| Tensile Strength, ksi 23/177/232 C. | 18.2/14.0/12.4 | 18.1/14.0/11.7 | 18.7/13.6/12.0 | 16.5/13.1/10.3 |
| Tensile Modulus, ksi 23/177/232 C. | 602/447/409 | 524/432/384 | 582/429/406 | 530/426/384 |
| % Elong. at break 23/177/232 C. | 14/7/7 | 12/6/5 | 30/11/12 | 22/23/10 |
| $G_{1c}$, (in lb)/in² | — | 4.9 | 5.7 | 2.2 |

TABLE 2

PRELIMINARY Ti-to-Ti TENSILE SHEAR PROPERTIES[1,2]

| TEST TEMPERATURE, °C. | SHEAR STRENGTH, psi | FAILURE MODE, % |
| --- | --- | --- |
| 23 | 2524 | ~60 Adh.[3] |
| 177 | 2276 | ~55 Adh. |
| 200 | 2024 | ~70 Adh. |
| 232 | 2267 | ~100 Coh. |

[1]3 Mole % molecular weight controlled endcapped PAEBI, $\eta_{inh}$ = 1.42 dL/g, Tg = 276 ° C.
[2]Specimens bonded at 250 psi/330° C./15 minutes
[3]Adh.: Adhesive, Coh.: Cohesive

TABLE 3

PRELIMINARY Ti-to-Ti TENSILE SHEAR PROPERTIES[1,2]:
Aging at 200° C. in Air

| Test Temp., °C. | 0 h | | 500 h | | 1000 h | |
|---|---|---|---|---|---|---|
| | Shear Strength psi | Failure Mode, %[3] | Shear Strength psi | Failure Mode, % | Shear Strength psi | Failure Mode, % |
| 23 | 3236 | ~90 Adh | 3357 | ~100 Adh | 3076 | ~100 Adh |
| 177 | 2235 | ~90 Adh | 2439 | ~90 Adh | 2562 | ~90 Adh |
| 200 | 2019 | ~80 Adh | 2491 | ~75 Adh | 2403 | ~80 Adh |
| 232 | 1649 | ~50 Adh | 1929 | ~70 Coh | 2336 | ~70 Coh |

[1]7 Mole % molecular weight controlled endcapped PAEBI, $\eta_{inh}$ = 0.52 dL/g, $T_g$ = 265° C.
[2]Specimens bonded at 250 psi/330° C./15 minutes
[3]Adh.: Adhesive, Coh.: Cohesive

TABLE 4

PRELIMINARY PROPERTIES OF CARBON FIBER (AS-4) UNIDIRECTIONAL COMPOSITES[1]

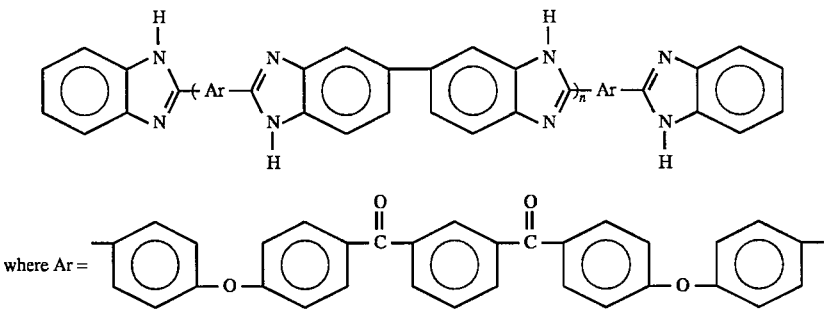

| TEST TEMP., °C. | FLEXURAL STREN., ksi | FLEXURAL MOD., msi | RESIN CONTENT[2] % |
|---|---|---|---|
| 23 | 277 | 19.7 | 31 |
| 23 | 233[3] | 14.9[3] | 35[3] |
| 23 | 209[4] | 15.9[4] | 35[4] |
| 200 | 187[4] | 15.6[4] | 35[4] |
| 232 | 163[3] | 14.5[3] | 35[3] |

[1]7% Stoichiometric imbalance fabricated at 360° C./200 psi/1 h
[2]Resin content determined by acid digestion using concentrated sulfuric acid and 30% hydrogen peroxide..
[3,4]Properties determined using specimens cut from the same panel.

We claim:

1. A molecular weight controlled and unendcapped poly(benzimidazole) consisting of repeat units having a general structural formula selected from the group consisting of:

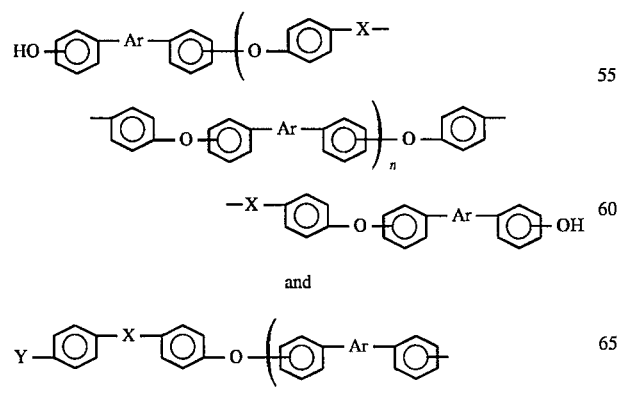

and

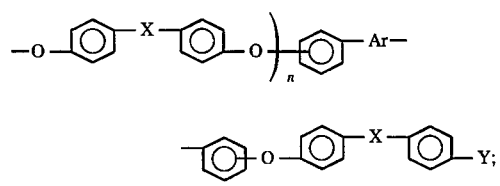

wherein the catenation of oxygen is selected from the group consisting of meta-meta, para-para, and para-meta; wherein Y is selected from the group of F, Cl, and $NO_2$;

wherein Ar is a radical selected from the group consisting of

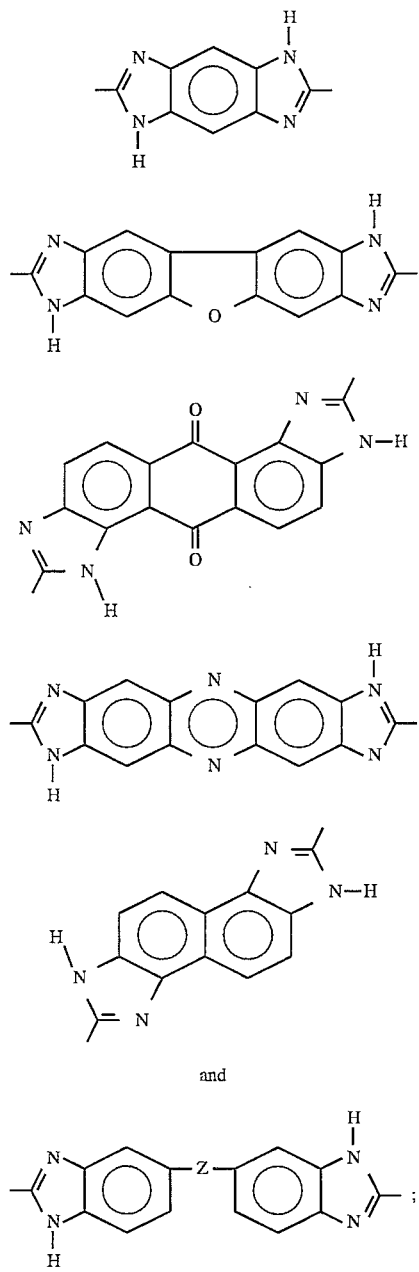

wherein Z is a bond or is a radical selected from the group consisting of: CH₂, O, S, O=C, SO₂,

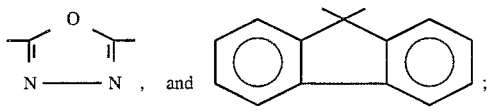

wherein X is a radical selected from the group consisting of:

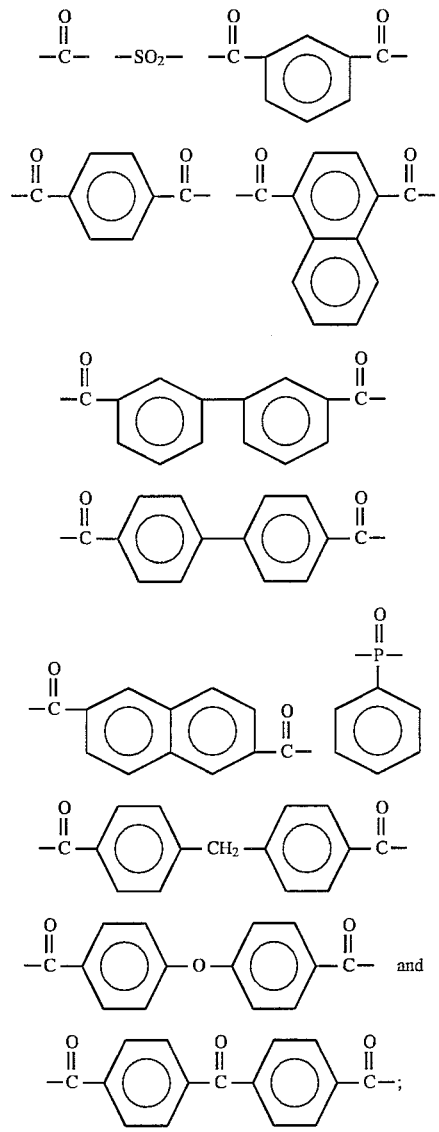

wherein n is an integer between 4 and 1000; and wherein monomer ratio (r) is $0.5 \leq r \leq 1$.

2. A film prepared from the molecular weight controlled and unendcapped poly(benzimidazole) of claim 1.

3. A film prepared from the molecular weight controlled and unendcapped poly(benzimidazole) of claim 1.

4. A molding prepared from the molecular weight controlled and unendcapped poly(benzimidazole) of claim 1.

5. An adhesive prepared from the molecular weight controlled and unendcapped poly(benzimidazole) of claim 1.

6. A matrix resin for composites prepared from the molecular weight controlled and unendcapped poly(benzimidazole) of claim 1.

* * * * *